May 5, 1931.  W. W. SPADONE ET AL  1,804,034
CUTTING AND STRIPPING MACHINE
Filed May 13, 1929  7 Sheets-Sheet 4

INVENTORS
WALTER W. SPADONE
CHARLES C. SPADONE
BY
Lotka, Kehlenbeck & Farley
ATTORNEYS May 5, 1931. W. W. SPADONE ET AL 1,804,034
CUTTING AND STRIPPING MACHINE
Filed May 13, 1929   7 Sheets-Sheet 7

INVENTORS
WALTER W. SPADONE
CHARLES C. SPADONE
BY
ATTORNEYS

Patented May 5, 1931

1,804,034

UNITED STATES PATENT OFFICE

WALTER W. SPADONE, OF NEW YORK, AND CHARLES C. SPADONE, OF ROCKVILLE CENTRE, NEW YORK

CUTTING AND STRIPPING MACHINE

Application filed May 13, 1929. Serial No. 362,468.

The invention relates to machines for cutting webs of material or the like into sections, and more particularly to machines for transversely cutting webs of frictioned duck such as is commonly used in the manufacture of pneumatic tires, hose and the like. The invention has for its object to provide an improved machine of the indicated class, and more particularly contemplates the provision of cutting and stripping mechanisms of improved construction and increased efficiency. Other objects will appear from the description hereinafter and the features of novelty will be pointed out in the claims.

In the accompanying drawings, which illustrate an example of the invention without defining its limits.

Figure 2:
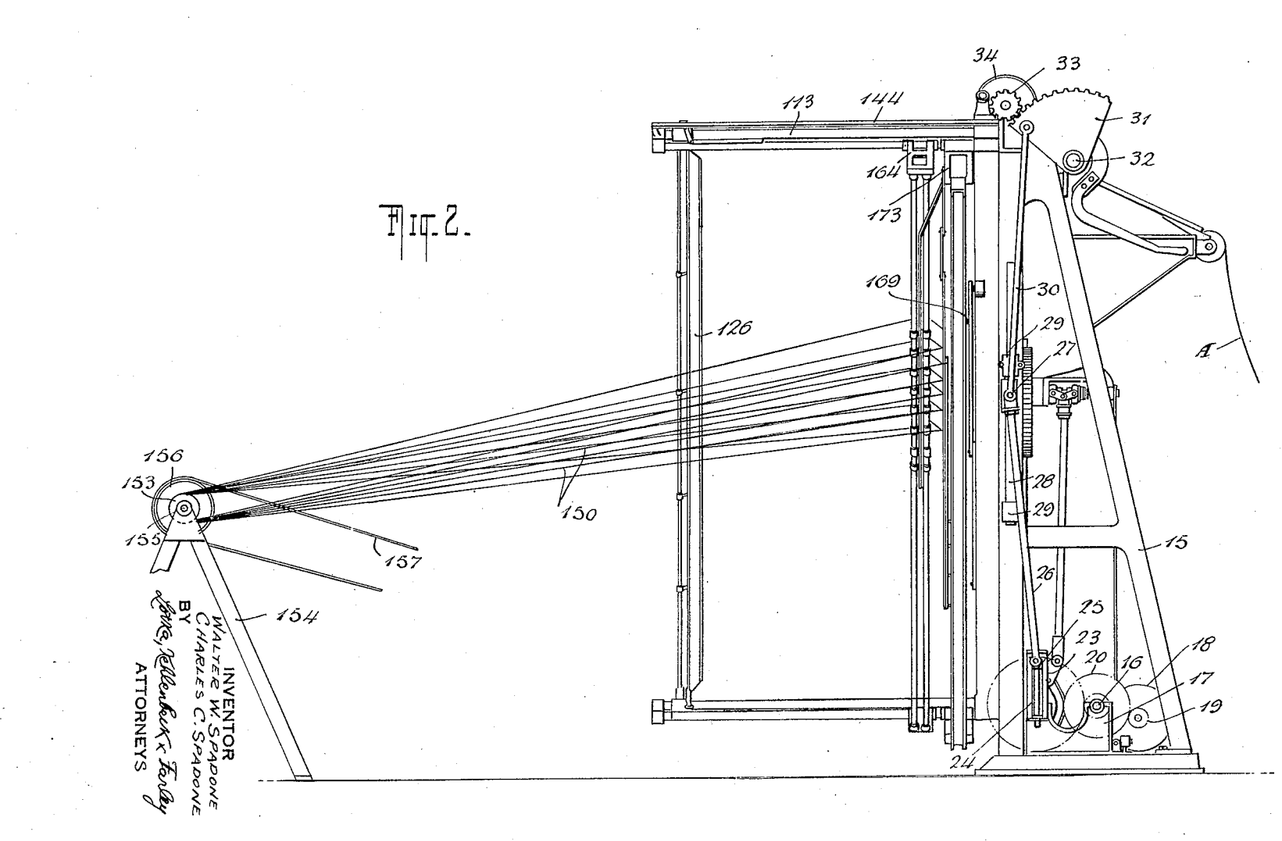
Fig. 2 is a side elevation thereof.

In the illustrated example the machine includes a main frame 15 of suitable construction on which a power shaft 16 is journalled in bearings 17 of customary form, and driven in any convenient manner, as by means of an electric motor 18 having a pinion 19 in mesh with a gear 20 fixed upon the shaft 16. The latter is connected by suitable gearing 21 with a countershaft 22 rotatably mounted on the frame 15, provision being made in any well known way, as by means of a conventional clutch, for connecting and disconnecting the countershaft 22 with and from the main shaft 15 at will. At its one end the countershaft 22 carries a crank-member 23 slotted lengthwise as indicated at 24 to slidably receive an adjustable block 25, suitable means being provided for adjusting and setting said block 25 in the slot 24 to vary the extent of the feeding steps of the web of material to be cut. A rod 26 is pivotally connected at one end with said block 25 and at its other end is pivotally connected at 27 with a bar 28 vertically slidable in guide bearings 29 mounted upon the frame 15. A second rod 30 has its one end connected with the pivot 27 and at its other end is pivotally secured to a toothed segment 31 pivoted at 32 upon a suitable portion of the frame 15 and meshing with a pinion 33, as shown in Fig. 2. The pinion 33 is operatively combined with a feed roller 34 journalled upon the frame 15, the arrangement being such that the operation of the segment 31 and pinion 33 in one direction will constitute a feeding step whereby the roller 34 will be rotatively advanced to correspondingly feed the web of material relatively to the cutting means, while the operation of said segment and pinion in the opposite direction will comprise movements of recovery during which said feed roller 34 remains idle. The mechanism so far described may be of any existing arrangement such as, for instance, as shown in United States Patent No. 1,384,984, of July 19, 1921.

Figure 8:
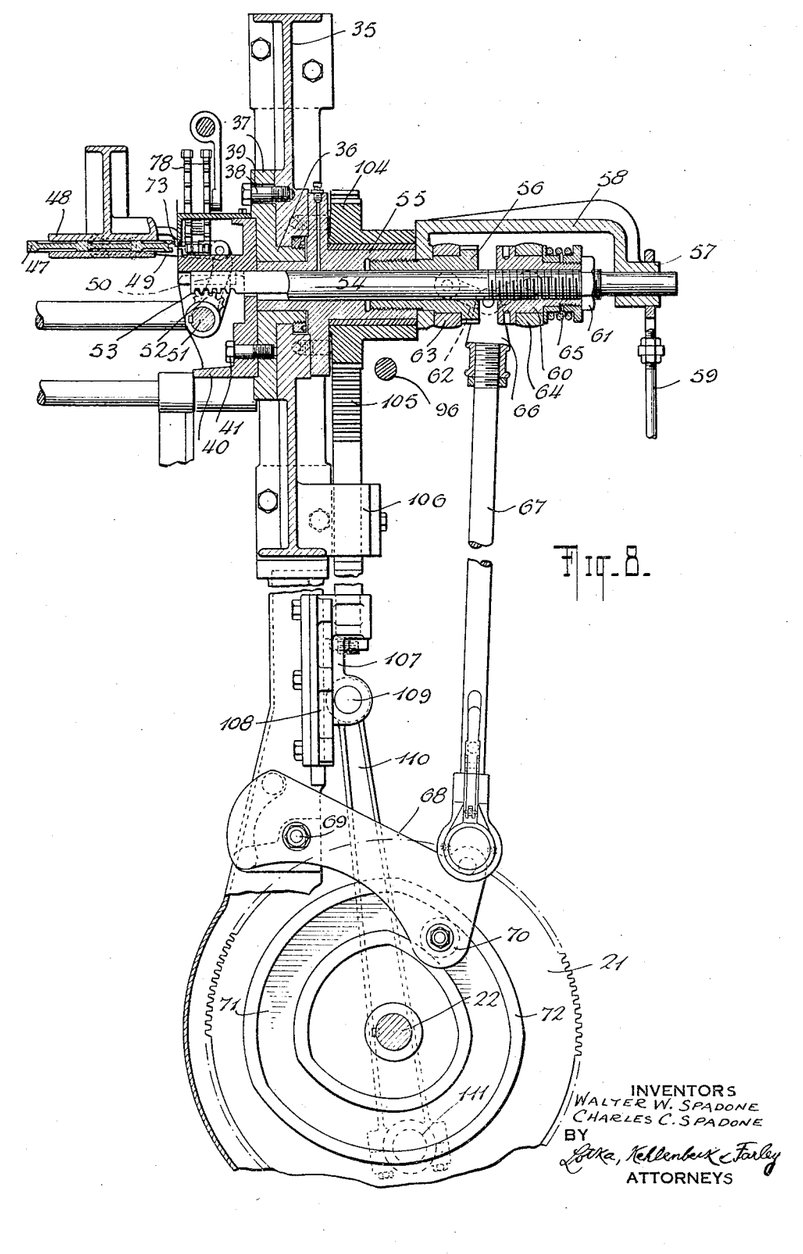
Fig. 8 is a detail vertical section on an enlarged scale.

The machine, in its illustrated form, further includes a cross-brace 35 which extends between and is bolted to the opposite side members of the frame 15, said cross-brace 35 being provided with an opening into which fits the neck 36 of a raceway locator 37; the neck 36 is screwthreaded for the accommodation of a lock nut 36ª, which may be positioned in a recess provided for the purpose in the cross-brace 35, as shown in Fig. 8, said lock nut 36ª by bearing against the latter serving to secure the locator 37 in surface engagement with the front face of said cross-brace 35. A bolt 38 projects from the latter through a segmental slot 39 of said locator 37 to permit the latter to rotate on the face of said cross-brace 35 for the purpose of adjusting the position of the raceway 40 which is secured to said locator 37 by one or more bolts 41. The frame 15 includes vertical grooves 42 for slidably accommodating fastening devices which co-operate with suitable means on said raceway 40 to clamp the latter in an adjusted position on the frame 15 in the manner illustrated and described in Patent #1,384,984 hereinbefore referred to.

Figure 10:
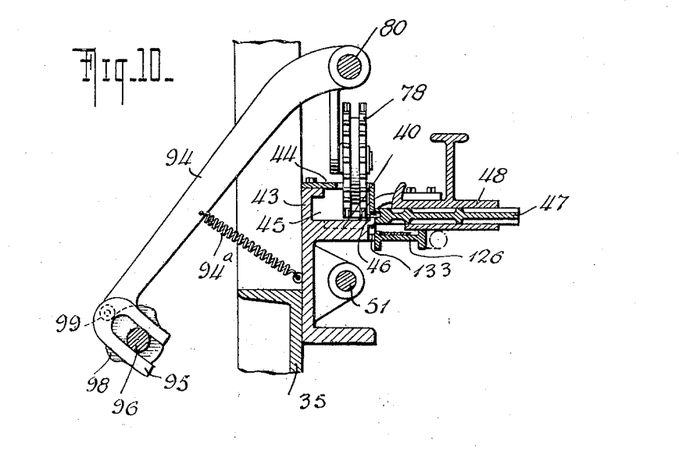
Fig. 10 is a detail section thereof on the line 10—10 of Fig. 9.

The raceway 40 is provided with a lengthwise extending flange 43 to which a cover 44 is fastened in a manner to form a channel 45 extending lengthwise of said raceway and a longitudinally extending cutting slot 46, as shown in Figs. 8 and 10. For the purpose of securely clamping the web of material in position while a cut is being made, a movable clamping bar 47 is provided in registry with the aforesaid cutting slot 46, so as to be adjustable into and out of operative position in alternate sequence. The clamping bar 47 preferably is grooved lengthwise on its clamping face and may be arranged and controlled as illustrated in said Patent #1,384,984, and accordingly is shown as being slidably mounted in a support 48 suitably fastened to the raceway 40. The clamping bar 47, as shown, is connected by means of links 49 with arms 50 fixed upon a rock shaft 51 journalled in suitable brackets connected with the raceway 40, said shaft 51 carrying a toothed quadrant 52 which meshes with a rack 53 comprising an extension of a slidable rod 54 as shown in my patent above mentioned. The rod 54 is slidably mounted in a bearing member 55 which is fastened to the rear face of the cross-brace 35 and is internally screwthreaded to receive a toggle-sleeve 56 through which said rod 54 projects, as shown in Fig. 8. The outer end of the rod 54 is slidably supported in a bearing 57, which forms part of a bracket 58 secured in place by means of the toggle sleeve 56, as illustrated in Fig. 8; to reduce vibration in the bearing 57 to a minimum a suitable brace 59 may be provided.

At a point normally located between the toggle-sleeve 56 and the bearing 57, the rod 54 is screwthreaded to receive a second toggle-sleeve 60, similar to the toggle-sleeve 56 and secured against displacement on said rod 54 by a lock nut 61. Toggle links 62 are pivotally connected respectively with a collar 63 carried by the sleeve 56 and a collar 64 yieldingly mounted upon the sleeve 60 and influenced by a spring 65. The toggle-links 62 further are pivotally connected with each other and with a toggle-yoke 66 threaded upon a connecting rod 67 which in turn is pivotally connected with a rocking member 68 pivoted at 69 upon a convenient part of the machine. A roller 70 is mounted upon the rocking-member 68 and projects into the cam groove 71 of a cam 72, which may form an integral part of the gear 21 fixed on the countershaft 22. The clamping means, with the toggle mechanism and associated elements may all operate in the same way as the corresponding mechanism shown in the previously mentioned Patent #1,384,984 and may be of the same general construction and arrangement.

Figures 6, 7:
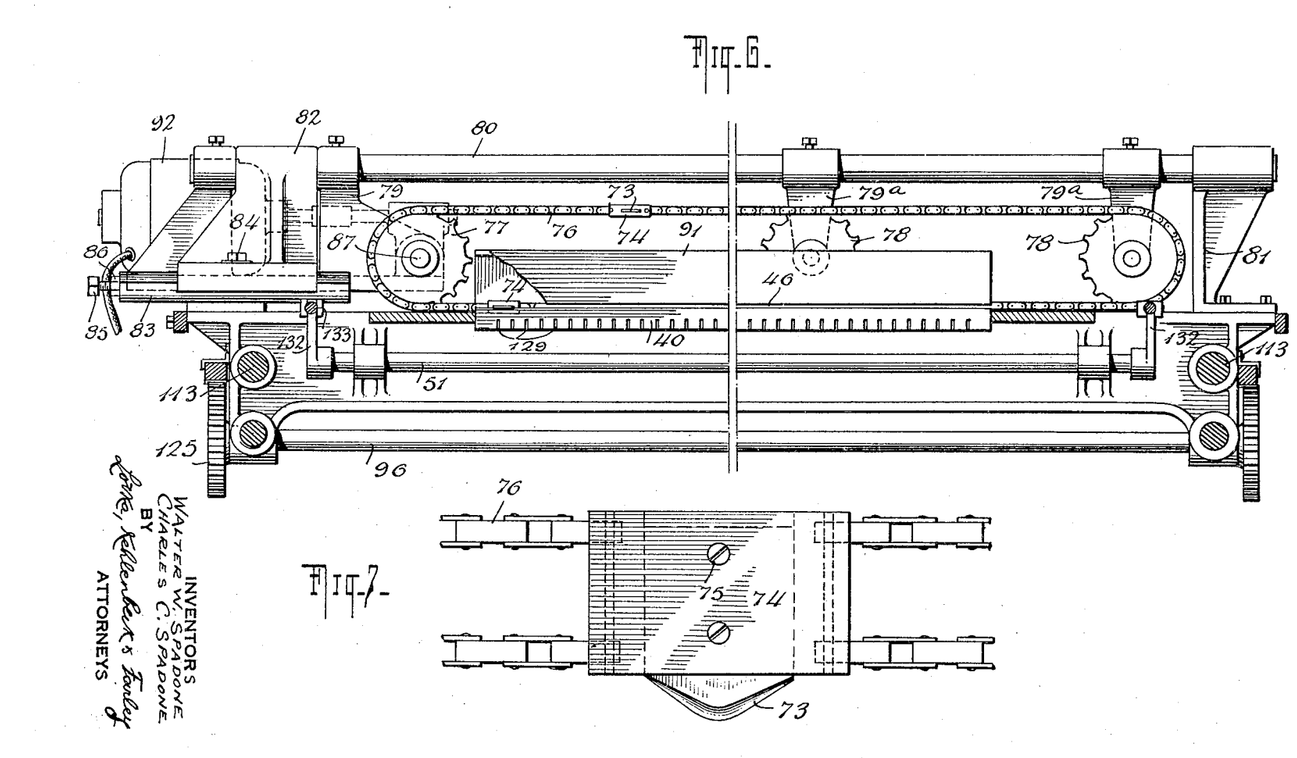
Fig. 6 is a detail elevation partly in section, showing the cutting means and its associated elements.
Fig. 7 is an enlarged detail plan view of a cutting knife and its carrier forming part of the cutting means.

The cutting mechanism, which will now be described, constitutes a novel feature of the improved machine, and consists of a cutting device having a direction of travel which is constant and which is brought into and out of cutting relation to a web of material A in alternate sequence; in the form shown in Figs. 6 and 7 the cutting mechanism includes one or more cutting members or knives 73, each removably secured in a suitable carrier 74 in any convenient manner, as by means of screws 75. The cutting member or members 73 or their equivalent are arranged to travel in and along the channel 45 of the raceway 40 and are arranged to be alternately projected outwardly through the cutting slot 46 into cutting positions to effect the cuts, and adjusted to inoperative positions during the feeding steps in which the web of material A being cut is periodically advanced, as will be more fully described hereinafter. In the illustrated example the mechanism whereby the cutting member or members 73 or their equivalent are caused to travel lengthwise of the channel 45 includes a pair of spaced, parallel sprocket chains 76, which are connected with the carriers 74 and pass over a driven sprocket wheel 77 and idler sprocket wheels 78 so arranged that the one run of said chains 76 extends lengthwise of and is movable in the channel 45, as shown in Figs. 6 and 10.

The sprocket wheels 77 and 78 are rotatably mounted upon brackets 79 and 79$^a$ fixed upon and depending from a shaft 80 journalled in suitable bearings 81 and 82 supported in any convenient manner upon the raceway 40. In the illustrated example the bearing 81 occupies a fixed position on the raceway, while the bearing 82 is slidably mounted upon a guide 83 fixed on said raceway 40, so as to be adjustable toward and away from the bearing 81 and is fixed in an adjusted position by means of a set screw 84; to facilitate the shifting of the bearing 82 on the guide 83, an adjusting screw 85 and lock-nut 86 may be provided as shown in Fig. 6.

Figure 11:
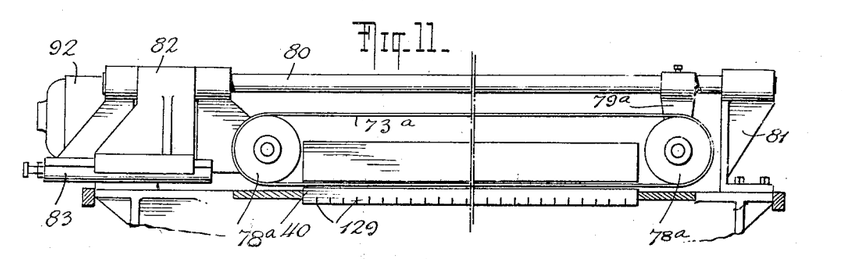
Fig. 11 is a detail view showing another form of cutting means.

In the form shown in Fig. 11 the cutting knives 73, sprocket chains 76 and sprocket wheels 77 and 78 are replaced by an endless flexible band of metal provided with a cutting edge and constituting an endless cutting band or member 73$^a$ which passes over pulley wheels 77$^a$ and 78$^a$ mounted, for instance, in the same way as the sprocket wheels 77 and 78.

For the purpose of actuating the cutting knives and sprocket chains 76, or the cutting band 73$^a$, in directions which remain constant, the driven sprocket wheel 77 or its equivalent, the driven pulley wheel 77$^a$ is mounted upon a stub-shaft 87 suitably journalled on the bracket 79 and carrying a worm-wheel 90 which meshes with a worm-gear 88; the latter is fixed upon the drive shaft 91 of a motor 92 mounted upon a bracket 93 which, as shown, forms an integral part of the bracket 79 so that said motor 92 and its associated elements partake of the rocking movements of the shaft 80 as will appear more fully hereinafter.

Figure 9:
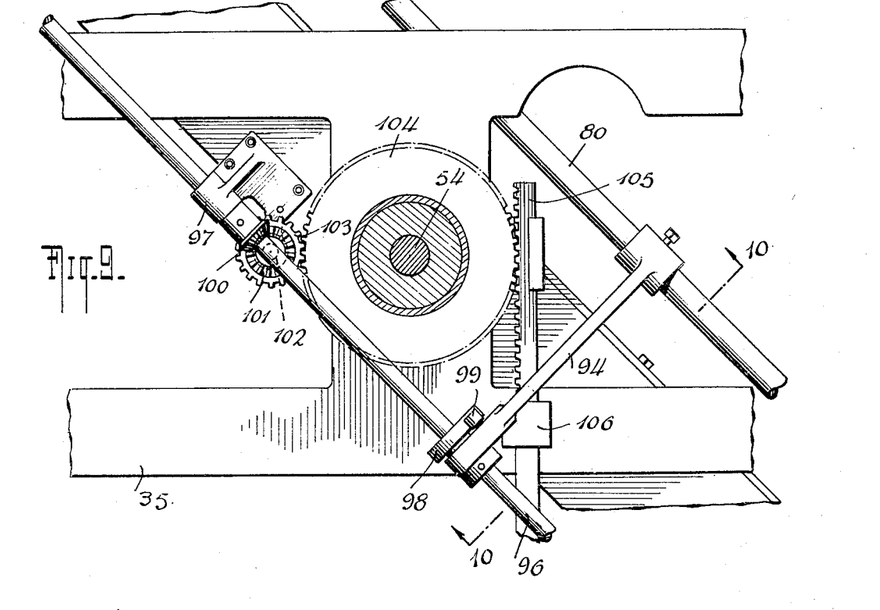
Fig. 9 is an enlarged detail of the mechanism for controlling the adjustment of the cutting means to and from its operative position.

In the illustrated example, the cutting means is pivotally swung into and out of cutting relation to the web A in alternate sequence, it being understood that the same operative results may be obtained in other ways if desired, or found more convenient; the shaft 80 accordingly constitutes a rock-shaft which is rocked on its axis to alternately shift the knives 73 or band 73ª into and out of cutting position. The means whereby this is accomplished may consist of one or more levers 94 secured upon the rock-shaft 80 at the proper point or points and each having a forked end 95 which straddles a counter rock-shaft 96 journalled in suitable bearing 97, as shown in Figs. 9 and 10 of the drawings. The shaft 96 carries one or more cams 98 arranged to engage rollers 99 mounted upon the levers 94 and maintained in engagement with the cams 98 by springs 94ª, said cams 98 being constructed to shift the knives or the band 73ª to and from their cutting paths and to maintain them in their operative and inoperative positions for the necessary time periods without interfering with the operation of the sprocket chains 76 or the linear travel of said knives 73 or cutting band 73ª.

As shown in the drawings, the counter rock-shaft 96 carries a bevel pinion 100 which meshes with a co-operating bevel pinion 101 secured upon a stub-shaft 102 suitably mounted on the raceway, and having fixed thereon a pinion 103. The latter meshes with a gear 104 rotatably mounted upon the bearing member 55, as shown in Figs. 8 and 9, said gear 104 also being in toothed engagement with a toothed rack 105 slidably mounted for vertical reciprocation in bearings or guides 106 suitably located and secured in the machine. At its lower end the rack 105 is connected with a block 107 vertically slidable in a fixed guide 108 and pivotally connected at 109 with one end of a connecting rod 110; the latter, at its other end, is connected at 111 with the face of the gear 21 so that the latter functions in the nature of a crank, as illustrated in Fig. 8.

In machines of the type described, it is desirable to reduce the necessity for manually handling the cut sections as much as possible, which is particularly so in that class of machines which are used for cutting frictioned duck or other tacky material; the latter, because of its tackiness, tends to adhere to parts of the machine, which tendency is aggravated along the cutting line by the action of the clamping bar 47. To release the adhering material and to convey the cut sections away from the cutting mechanism and associated elements, the improved machine is accordingly provided with a novel stripping means and an efficient conveying means which will now be described in succession.

Figure 3:
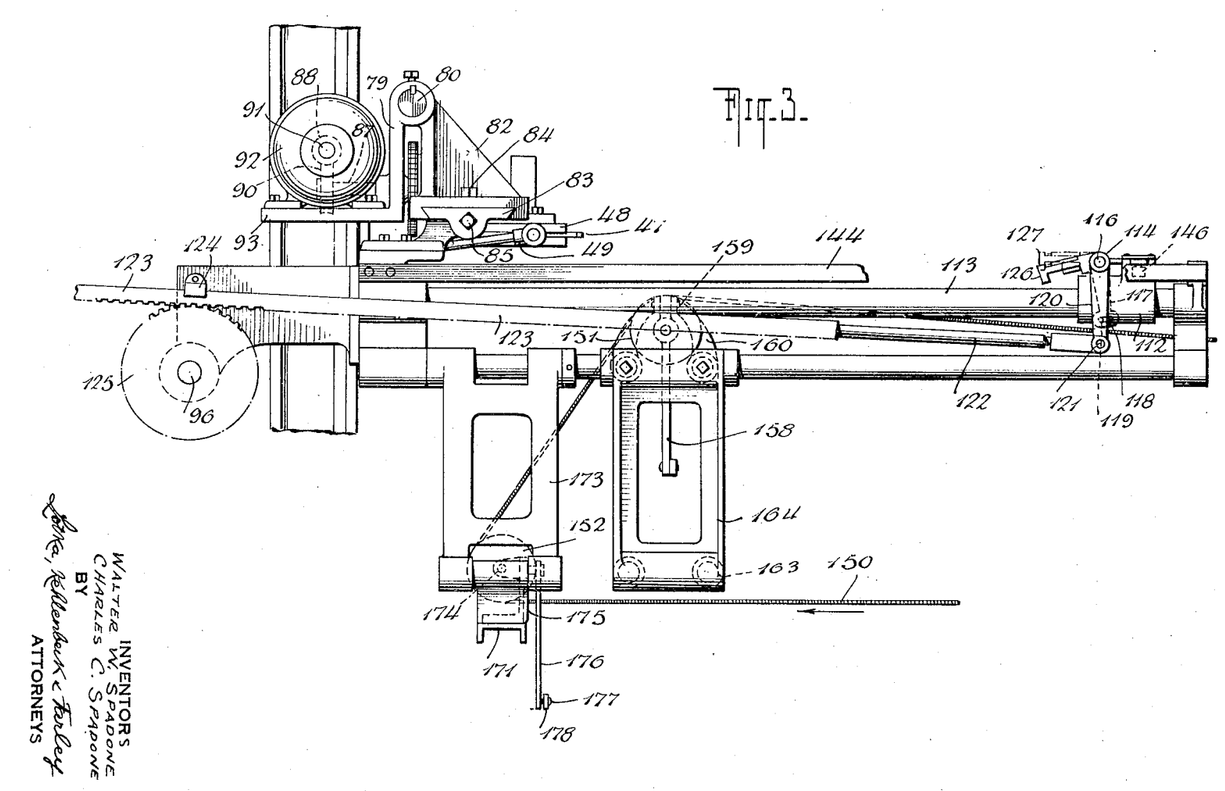
Fig. 3 is a detail side view on an enlarged scale.
Figure 4:
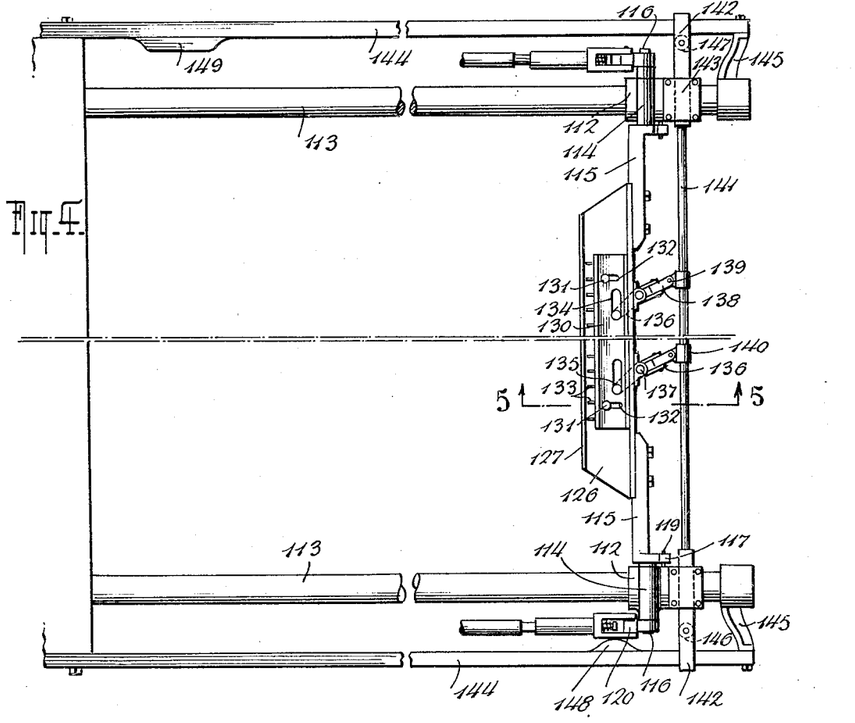
Fig. 4 is a fragmentary plan view.
Figure 5:
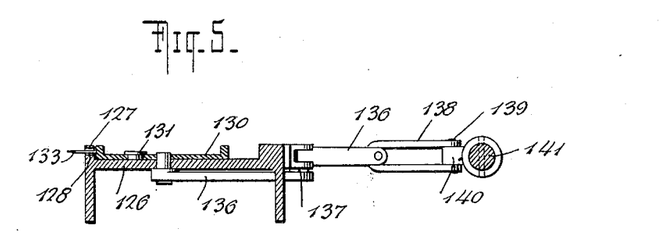
Fig. 5 is a detail sectional view on the line 5—5 of Fig. 4.

The novel stripping means, in its illustrated form, comprises slides 112 arranged to be reciprocated in directions toward and away from the cutting mechanism, and accordingly being slidably mounted upon the rods 113 secured to and projecting from suitable portions of the machine frame. The slides 112 are provided with bearings 114 in which a carrier 115 is pivotally mounted by means of trunnions 116, as shown in Fig. 4, said carrier 115 including rigid arms 117, which depend therefrom in proximity to the slides 112 and at their free ends are formed with slots 118 into which project pins or studs 119 fixed upon said slides 112, as shown in Figs. 3 and 4. Levers 120 are secured upon and project downwardly from the trunnions 116 and are pivotally connected at 121 with rods 122 which are connected with or comprise extensions of racks 123 slidable in fixed guides 124 in meshing engagement with gears 125 secured upon the shaft 96, as illustrated in Fig. 3. The carrier 115 includes a channelled member 126 provided in its flange 127 with a plurality of apertures 128 located in registry with a corresponding number of downwardly open slots 129 formed in the raceway 40 below the cutting slot 46 as shown in Figs. 6 and 10 for the purpose to be more fully set forth hereinafter. Upon the upper surface of the horizontal web of the channelled member 126 is movably mounted a stripping member 130 secured in surface engagement with said web by means of headed studs 131 which project through transverse slots 132 formed in the member 130, as illustrated in Figs. 4 and 5; along its upright front face the stripping member 130 is provided with a plurality of pointed projections or prongs 133 corresponding in number and arranged to be projected and retracted through the apertures 128 as the stripping member 130 is shifted toward and away from the flange 127 in the operation of the machine.

For the purpose of effecting the aforesaid actuation of the stripping member 130, the latter is provided with longitudinal slots 134 extending in directions at right angles to the slots 132 for the accommodation of studs 135 mounted upon levers 136 pivoted at 137 upon the channelled member 126; the levers 136 are contiguous to the lower face of the web of the member 126, which is suitably slotted to permit the desired movements of the studs 135 and the levers 136.

The latter are forked as indicated at 138 for pivotal connection at 139 with lugs 140 fixed upon a rod 141, which is arranged to be reciprocated in directions transverse to the reciprocal movements of the slides 112 and carrier 115; the rod 141 at its opposite ends terminates in yokes 142 slidably mounted in guide bearings 143 forming parts of the slides 112. The yokes 142 extend over bars 144 extending in spaced parallel relation to the rods 113 and secured in place by means of brackets or the like 145, said yokes 142 being provided respectively with rollers 146 and 147 arranged to travel lengthwise of said bars 144 for alternate engagement by cams 148 and 149 with which said bars 144 are respectively provided at the proper points.

In the illustrated example the previously mentioned conveying means comprises a plurality of individual endless belts 150 which pass over pulleys 151 and 152 located on the raceway 40, and pulleys 153 journalled upon an auxiliary frame 154, as shown in Fig. 2. To provide the most efficient operation, the pulleys 151 and 152 are positioned in groups, with the group of pulleys 152 below the pulleys 151, the belts 150 preferably consisting of endless coil springs for the purpose of automatically maintaining said belts under tension in all positions of the raceway 40 on the frame 15; in other words, the necessity for special means for adjusting the belts 150 to meet variations in the position of said raceway 40 is entirely avoided. Any suitable means may be utilized for operating the conveying means, as for instance, by locating the pulleys 153 upon a shaft 155 which is provided with a belt pulley 156 and connecting the latter by means of a belt 157 with a corresponding pulley on the shaft 16 or the counter shaft 22.

Because of the fact that the raceway 40 is adjustable to different positions on the frame 15, and inasmuch as the pulleys 151 152 partake of the movements of adjustment, while the pulleys 153 remain in a permanent location it is necessary to mount the pulleys 151 and 152 so that they will always stand vertical, and so that the pulleys 152 will always be in vertical alignment with the pulleys 151 regardless of the position of the raceway 40.

Figure 1:
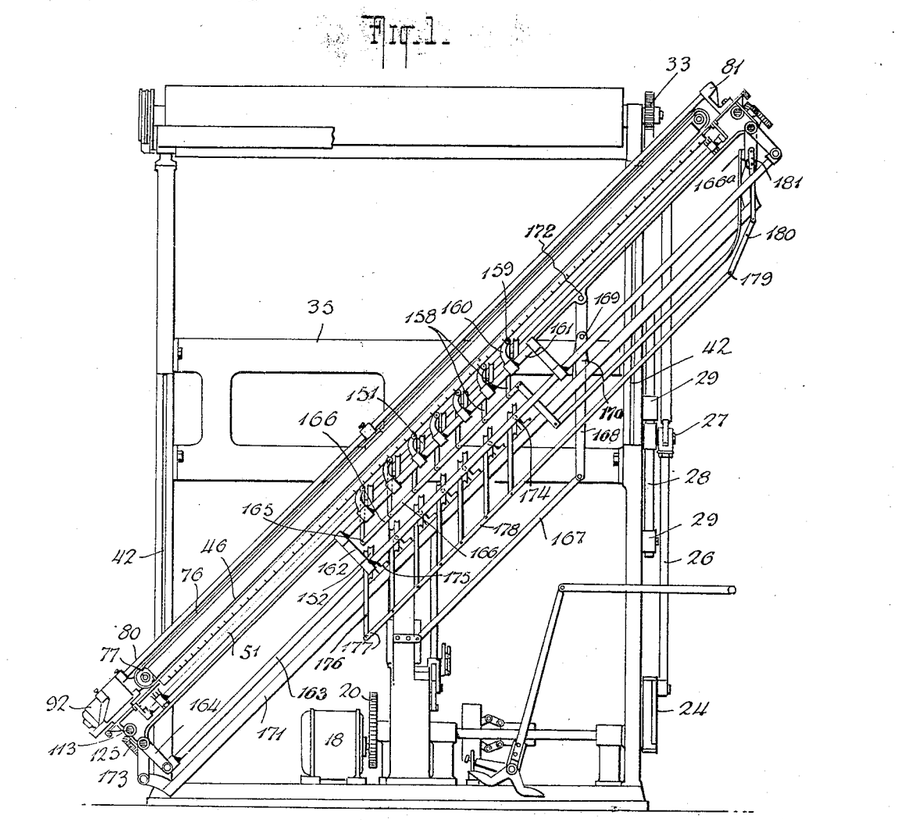
Fig. 1 is a front elevation of the improved machine.

The pulleys 151 are accordingly journalled upon levers 158 pivotally connected at 159 with arms 160 fixed upon a rod 161, which in turn is carried by brackets 162 secured upon a rod 163; the latter is supported by means of supporting members 164 upon the raceway 40, as shown in Fig. 1. For the purpose of automatically setting the pulleys 151 in proper position with respect to each other and relatively to the raceway 40, in all adjustments of the latter, the levers 158 are pivotally connected at 165 with a bar 166 pivotally connected at 166ª with one of a pair of links 173 pivotally mounted on the raceway 40. The links 173 are pivotally connected with a bar 171 which carries a lug 170 pivotally connected at 169 with a lever 168 pivotally attached at 172 to the raceway 40; the lever 168 is further pivotally connected with one end of a link 167, the other end of which is pivotally secured to a suitable stationary portion of the frame 15.

The pulleys 152 are journalled in bearing brackets 174 which are pivotally mounted on lugs 175 fixed upon the bar 171, and connected with levers 176, which in turn are pivotally connected at 177 with a bar 178; the latter in turn is pivotally connected at 179 with a link 180 attached at 181 to one of the aforesaid links 73, as shown in Fig. 1.

With the arrangement set forth, it will be obvious as the raceway 40 and its associated elements are adjusted to different positions on the frame 15, the lever 168 will partake of the movements of the raceway 40 and accordingly will rock the link 167 on its pivotal connection with the main frame 15. This rocking of the link 167 in turn will cause the lever 168 itself to be swung upon its pivot 172 and accordingly, through its connection 169, with the lug 170, will shift the bar 171 lengthwise relatively to the raceway 40 in one direction or the other. As this occurs the links 173 will be pivotally actuated and, the bar 166, because of its connection with the one link 173 will either be pulled in one direction or pushed in the other to thereby cause the levers 158 to be swung on the pivots 159 and thus bring about a pivotal adjustment of the pulleys 151. The aforesaid pivotal actuation of the links 173 will at the same time shift the bar 178 in the direction of its length, these movements being brought about through the medium of the link 180 and its connection 181 with said one link 173. As the bar 178 is operated in the indicated manner, a pull or a push will be developed in said bar 178, which will be transmitted to the levers 176 and thereby will bring about a corresponding pivotal movement of the pulleys 152. From the above it will be clear that the pulleys 151 and 152 are not only maintained in proper vertical positions at all times, but also, that the pulleys 152 are maintained in proper vertical registry with the pulleys 151 in all positions of the raceway 40. Any variations in the distances between the pulleys 151—152 and the pulleys 152 which may result from changes in the position of the raceway 40, will be automatically taken care of by the coil springs, which preferably constitute the conveyor belts 150; in other words, the latter will stretch and contract in a manner to compensate for any variations in the aforesaid distances, without requiring any extraneous adjustments of the belts 150 to maintain the latter under a proper tension.

In practice, when it is desired to use the machine, the raceway 40 is adjusted to the proper position on the frame 15 dependent upon the angle or direction in which the web of material A is to be cut, it being understood that this cut may be on the bias at any desired angle, or approximately straight across said web. During the adjustment of the raceway and its associated elements on the frame 15, the locator 37 serves as a pivot, said raceway being fixed in its adjusted position by suitable securing means co-operating with the grooves 42 of the frame 15 in the manner shown and described in Patent No. 1,384,984. The free end of the web of material A is then passed over and into connection with mechanism such as is disclosed in Patent #1,384,984 referred to above, and finally is passed over the roller 33, from which it depends in the space between the clamping bar 47 and the cutting groove 46. During the continued operation of the machine, this depending section of the web A will be fed by the feed roller 33 and its associated elements in successive steps dependent upon the predetermined distance between the cuts, or, in other words, the dimensions of the cut sections. The machine is started by throwing in suitable clutch mechanism to bring about a rotation of the power shaft 16, it being understood that the motor 18 is in operation, the operation of the shaft 16 bringing about a corresponding operation of the countershaft 22. As this occurs, the gear 21 will be rotated to exert an alternate push and pull upon the connecting rod 110 whereby the slide 107 is vertically reciprocated to cause a corresponding reciprocation of the rack 105. This movement of the rack 105 is transmitted to the gear 104 and causes the latter to rotate and transmit its movement to the gear 103, which in turn brings about a rotation of the bevel gears 101 and 100, and rocking movement of the shaft 96. This rocking movement of the shaft 96 brings about a corresponding operation of the cams 98, which by co-operating with the rollers 99 cause the levers 94 to rock the shaft 80 in its bearings and consequently oscillate the brackets 79 and 79ª in a manner to adjust the cutting mechanism to and from its cutting path in alternate sequence, or in other words, to alternately swing the lower runs of the sprocket chains 76, or the lower run of the cutting band 73ª toward and away from the cutting slot 46; in this way the cutting knives 73 or the cutting band 73ª are alternately caused to project through said cutting slot 46 during the period of operation in which the web of material A is cut and retracted therefrom to inoperative positions during the feeding steps in which the web of material A is advanced for a successive cut. As the aforesaid adjustment of the cutting mechanism toward and away from its operative position takes place, the electric motor 92 which partakes of these movements of adjustment is operating to transmit motion through its drive shaft 91 and worm gearing 88 and 90 to the stub shaft 87 and to the driven sprocket wheel 77. As a result of this, the sprocket chains 76 are constantly operated in a given direction to cause the carrier 74 to travel lengthwise of the channel 45 and to correspondingly cause the knives 73 to pass lengthwise along the cutting slot; the same is true of the lower run of the cutting band 73ª which is actuated in a corresponding manner.

The rotation of the countershaft 22 also operates the cam 72 whereby the member 68 is rocked on its pivot 69 in directions to reciprocate the connecting rod 67 to alternately straighten out and break the toggle joint composed of the toggle links 62. This operation of the toggle links 62 brings about a reciprocation in horizontal directions of the rod 54 and accordingly through the medium of the quadrant 52 and rack 53 and associated elements, reciprocates the clamping bar 47 in a manner to clamp the web A against the operations of the raceway 40 adjacent to the cutting slot 46 during the cutting operation and to release the same when the cut has been completed.

As the above operations of the cutting mechanism and clamping bar take place, the shaft 96, which as previously stated herein, is rocked on its axis, correspondingly rocks the gears 125 and thereby causes the racks 123 and the rods 122 to be reciprocated in horizontal directions. As this occurs, assuming, for instance, that the parts are in the position shown in Fig. 3, an initial pull will be exerted upon the levers 120 whereby the trunnions 116 will be rocked to swing the arms 117 and raise the channelled member 126 from the position shown in full lines in Fig. 3 to the position shown in dotted lines therein, this initial movement of the parts being arrested by the co-operation of the pins 119 with the slots 118. Continued operation of the gears 125 and racks 123 will now draw the slides 112 lengthwise of the rods 113 to shift the channelled member 126 toward the raceway 40. As the slides 112 travel along the rods 113 in the indicated direction, the yokes 142 will travel in a corresponding manner lengthwise of the bars 144 so that at a predetermined point the roller 147 will ride over the cam 149 and accordingly shift the rod 141 in the bearings 143 in a downward direction in Fig. 4. This movement of the rod 141 will be transmitted to the levers 136, which will accordingly be swung on their pivots 137 to shift the pins 135 from the lower ends of the slots 134 to the upper ends thereof. This shifting of the pins 135 in the slots 134 will slidably move the stripping member 130 relatively to the channelled member 126 in a direction toward the left in Fig. 4 and accordingly will project the prongs 133 through the apertures 128 of the flange 127 to the position indicated in Fig. 5. It will be understood that the mechanism is so timed that the channelled member 126 with the projected prongs 133 reaches the raceway 40 at about the time the cutting of the web A has been completed and that said prongs 133 extend through the downwardly open slots 129 and project into the web A below the cut, which is being made. At the finish of the cut, the cut section of the web A is therefore impounded upon the prongs 133 and depends therefrom. At this time the operation of the mechanism brings about a rotation of the gears 125 in a reverse direction and accordingly causes the racks 123 and rods 122 to be correspondingly operated in return movements. As an initial step in this movement, the arms 120 will be pivotally operated to rock the trunnions 116 and the arms 117 in a direction to swing the channelled member 126 downwardly to a position approximating that illustrated in solid lines in Fig. 3; these initial movements of the parts again are arrested by the co-operation of the pins 119 with the slots 118. The downward swinging of the channelled member 126 carries the stripping member 130 in a corresponding movement and moves the prongs 133 downwardly and out of the slots 129, so that the cut section of the web A is now free from the raceway 40. Continued operation of the mechanism now causes the slides 112 to travel lengthwise of the rods 113 in reverse directions back to the positions illustrated in Figs. 3 and 4, it being understood that the cut section of material depending from the prongs 133 is carried along. As these movements take place, the yokes 142 correspondingly move lengthwise of the bars 144 so that the roller 146 will finally travel over the cam 148. As this occurs, the rod 141 will be shifted in the bearings 143 in an upward direction in Fig. 4 to pivotally operate the levers 136 and restore the stripping bar 130 to the position shown in Fig. 4, whereby the prongs 133 are retracted through the apertures 128 and the cut section of the web A consequently released from said prongs 133. It will be understood that the cam 148 is so located that this release of the cut section of the web A takes place at or near the end of the outward movement of the channelled member 126 and slides 112, and also, in receiving relation to the conveying belts 150. The latter accordingly receive said cut section of the web A and transfer it toward the rollers 153, or, in other words, toward the delivery ends of the belts 150 from which it may be removed either manually or in any other desired manner for further use.

The above operations of cutting, stripping and delivery of the cut sections to the conveyor belts are repeated in continuous sequence throughout any given period of operation of the machine. The cutting mechanism is extremely simple in construction and of maximum efficiency in operation and because of the fact that it may include a plurality of cutting knives, reduces the necessity for replacement of said knives to a minimum. Any number of duplicate sections of material may be successively cut from the web A with the improved machine and with the cut extending at any angle desired. The machine is particularly adapted for cutting frictioned duck or other tacky materials which are particularly destructive to the cutting edges of the cutting knives and remains in an efficient condition for maximum periods of time; in addition, the machine may be adapted for the cutting of silks, cotton and other fabrics or material which do not have a tacky characteristic. The apparatus is of relatively simple construction and is positive and efficient in operation to produce cut sections of uniform superiority. The apparatus may include means whereby the successive sections which are cut thereby are of different dimensions and may also have embodied therein any other special features which form parts of existing machines of the indicated class.

Various changes in the forms shown and described, as well as various substitutions for illustrated and described parts, may be made within the scope of the claims without departing from the spirit of the invention.

We claim:—

1. In a cutting machine including means for intermittently feeding a web of material in predetermined steps, the combination of a raceway non-yielding in the direction of cutting pressure and provided with a lengthwise extending channel and a cutting slot the ends of which define the opposite limits of the line of cut, endless cutting means arranged to travel lengthwise of said channel in a direction which is constant, and means for adjusting said cutting means into and out of said cutting slot in alternate sequence.

2. In a cutting machine including means for intermittently feeding a web of material in predetermined steps, the combination of a raceway non-yielding in the direction of cutting pressure and provided with a lengthwise extending channel and a cutting slot the ends of which define the opposite limits of the line of cut, endless cutting means having one run arranged exteriorly of said channel and the other run adapted to travel lengthwise thereof in a direction which is constant, and means for adjusting said cutting means to shift the run in said channel in a manner to move said cutting means into and out of said cutting slot in alternate sequence.

3. In a cutting machine including means for intermittently feeding a web of material in predetermined steps, the combination of a raceway provided with a lengthwise extending channel and a cutting slot, endless sprocket chains, sprocket wheels carrying said chains, means for operating said sprocket wheels, cutting knives carried by said sprocket chains and movable thereby lengthwise of said channel in a direction which is constant, and means for adjusting said sprocket chains transversely to their direction of travel to move said cutting knives into and out of said cutting slot in alternate sequence.

4. In a cutting machine including means for intermittently feeding a web of material in predetermined steps, the combination of a rock shaft, cutting means carried by said rock shaft and having a direction of travel which is constant, operating means carried by said rock shaft for actuating said cutting means, and mechanism whereby said rock shaft is rocked to move said cutting means to and from its cutting path in alternate sequence.

5. In a cutting machine including means for intermittently feeding a web of material in predetermined steps, the combination of a raceway provided with a lengthwise extending channel and a cutting slot, a rock shaft, sprockets carried by said rock shaft, endless cutting means mounted on said sprockets arranged to travel lengthwise of said channel in a direction which is constant, operating means for said cutting means carried by one of said sprockets, and means for rocking said rock shaft to adjust said cutting means into and out of said cutting slot in alternate sequence.

6. In a cutting machine including means for intermittently feeding a web of material in predetermined steps, the combination of a raceway provided with a lengthwise extending channel and a cutting slot, a rock shaft, brackets carried by said rock shaft, sprocket wheels mounted on said brackets, endless sprocket chains travelling over said sprockets, cutting knives carried by said sprocket chains and adapted to be moved thereby lengthwise of said channel in a direction which is constant, gearing carried by one of said brackets and operatively connected with one of said sprocket wheels, a motor carried by said one bracket and operatively connected with said gearing for actuating the same, arms connected with said rock shaft, cams co-operating with said arms to rock said rock shaft in a manner to adjust said cutting knives into and out of said cutting slot in alternate sequence, and means for operating said cams.

7. In a cutting machine including means for intermittently feeding a web of material in predetermined steps, and cutting mechanism adapted to transversely cut said web at predetermined intervals, the combination of stationary guiding means defining predetermined paths of travel, carriers slidably mounted on said guiding means, a stripping device mounted on said carriers, means for reciprocating said carriers and stripping devices on said guiding means to cause said stripping device to pick up the cut sections of said web and transfer them over said predetermined paths of travel, and means for releasing said cut sections from said stripping device.

8. In a cutting machine including means for intermittently feeding a web of material in predetermined steps, and cutting mechanism adapted to transversely cut said web at predetermined intervals, the combination of a stripping member, stationary guide rods defining predetermined paths of travel, slides slidably mounted on said rods, a carrier mounted upon said slides to move therewith, a stripping device movably mounted on said carrier, means for reciprocating said slides and carrier with said stripping device on said rods, and means for actuating said stripping device relatively to said carrier to cause it to pick up the cut sections on said web and to release them, said carrier being arranged to transfer said cut sections over said predetermined paths of travel.

9. In a cutting machine for cutting an intermittently fed web of material into sections, the combination of a cutting raceway provided with a plurality of downwardly open slots, stationary guide rods extending away from said raceway, slides arranged to be reciprocated on said rods, a carrier mounted on said slides to move therewith, a channelled member mounted on said carrier and provided with a plurality of apertures located in alignment and corresponding in number to said downwardly open slots, a stripping member movably mounted in said channelled member, prongs on said stripping member in registry with the openings of said channelled member, stationary bars extending in parallel spaced relation to said guide rods, a rod movable with said carrier and transversely slidable relatively to said guide rods, pivotally mounted levers connecting said rod with said stripping member, yokes connected with said rod and movable lengthwise of said stationary bars, rollers carried by said yokes, cams on said stationary bars co-operating with said rollers to slidably shift said rod whereby said stripping member is operated relatively to said channelled member to project said prongs through said openings into engagement with a cut section of said web to pick up the same, and withdraw said prongs from said openings to release said cut sections, and means for reciprocating said slides on said guide rods and for imparting initial rocking movements to said carrier and channelled member whereby said prongs in their extended position are moved downwardly out of said open ended slots to shift the cut section of said web relatively to the raceway and for restoring said channelled member to its normal position, said rocking movements of said channelled member taking place at the opposite ends of the paths of movement thereof, and conveyor means for receiving the cut sections of the web subsequent to their release from said stripping device.

10. In a cutting machine including means for intermittently feeding a web of material in predetermined steps, the combination of means for cutting said web transversely into sections, stripping means for removing the cut sections from said cutting means, conveying means comprising a plurality of endless coil springs for receiving said cut sections from said stripping device, and means for actuating said conveying means.

11. In a cutting machine including means for intermittently feeding a web of material in predetermined steps, the combination of a raceway adjustable to different inclinations, cutting means movable lengthwise of said raceway for cutting said web of material transversely into sections, stripping means for removing said cut sections from said cutting means, a plurality of pulleys movably mounted on said raceway, stationary pulleys located at a distance from said raceway, a plurality of travelling endless coiled springs passing over said pulleys and constituting a conveyor for receiving said cut sections from said stripping device, and means whereby said movable pulleys are automatically maintained in upright positions in all adjustments of said raceway.

12. In a cutting machine including means for intermittently feeding a web of material in predetermined steps, the combination of a raceway adjustable to different inclinations, cutting means movable lengthwise of said raceway for cutting said web of material transversely into sections, means for removing the cut sections from said cutting means, rotatable means movably mounted on said raceway, a travelling conveyor passing over said rotatable means and arranged to receive the removed cut sections, and means for automatically maintaining said rotatable means in upright positions in all adjustments of said raceway.

In testimony whereof we have hereunto set our hands.

WALTER W. SPADONE.
CHAS. C. SPADONE.